Sept. 8, 1925.
A. GIANNICO
1,553,289
MECHANICAL TURNER
Filed Nov. 17, 1924
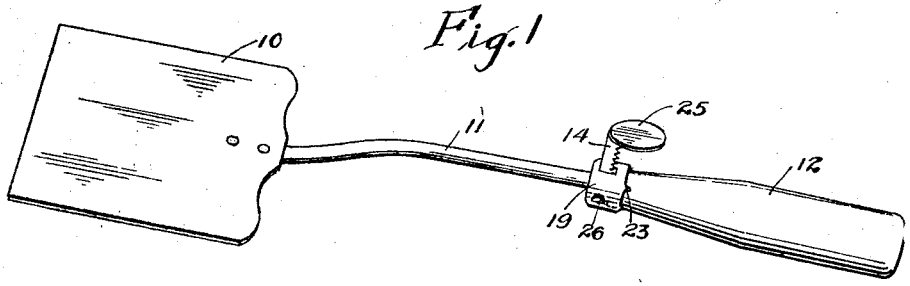
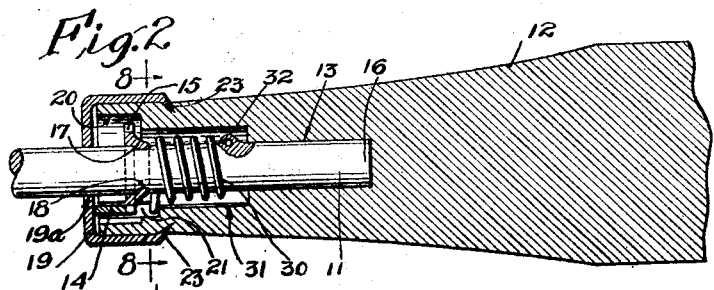
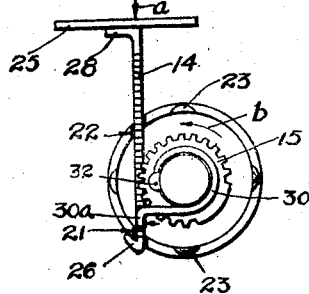
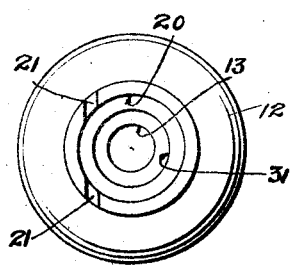
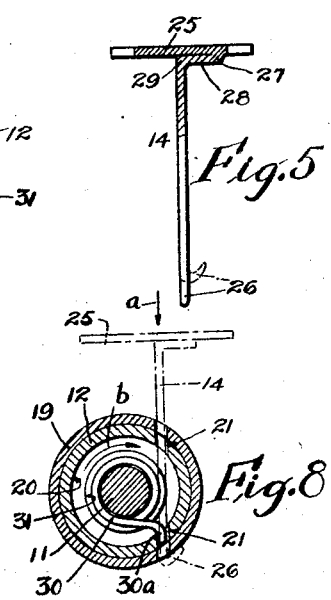
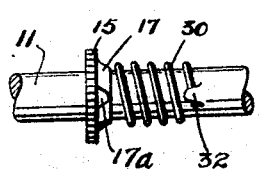
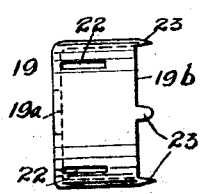
INVENTOR
A. Giannico
BY
Geo. F. Beele
ATTORNEY Patented Sept. 8, 1925.

1,553,289

UNITED STATES PATENT OFFICE.

ANTHONY GIANNICO, OF YONKERS, NEW YORK, ASSIGNOR TO CLARA K. MOORE, OF NEW YORK, N. Y.

MECHANICAL TURNER.

Application filed November 17, 1924. Serial No. 750,363.

*To all whom it may concern:*

Be it known that I, ANTHONY GIANNICO, a citizen of the United States, residing at Yonkers, in the county of Westchester and State of New York, have invented certain new and useful Improvements in Mechanical Turners, of which the following is a specification.

This invention relates to cake turners having means for automatically and efficiently turning a fishcake, pancake or the like.

Among the objects of this invention is to provide a cake turner having a rotatable blade, means operative by the hand of the operator for causing said blade to rotate in one direction for turning the cake, and means comprising a resilient member arranged in a novel manner which is operative to return said blade to normal position.

Another object of this invention is to provide a cake turner having a rotatable blade and means operative by the hand of the operator to cause said blade to rotate for turning the cake, said means comprising a rack and a pinion arranged to operate in an inexpensive and efficient manner.

Another object of this invention is to provide a cake turner having a rotatable blade, and means operative by the hand of the operator for causing said blade to rotate in one direction to turn the cake, said means comprising for this purpose toothed members such as a rack and pinion, and a resilient member for rotating said blade in an opposite direction to return the blade to normal position, a housing or ferrule being provided co-operating with said means to render the same operative in an easy and efficient manner and for permitting a rapid and inexpensive assemblage of said means.

Still another object of this invention is to provide a cake turner having means for rotating the blade thereof, said cake turner having a handle constructed in a novel manner and co-operating with said means to permit of a neat and inexpensive construction.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a perspective view of the cake turner.

Fig. 2 is a view of a central section showing the operating means.

Fig. 3 is an inside end view of the operating means with the handle removed.

Fig. 4 is an end view of the handle.

Fig. 5 is a view of an actuator with parts in section.

Fig. 6 is a view of a portion of the operating means.

Fig. 7 is a side view of the ferrule.

Fig. 8 is a view of a section taken on the line 8—8 of Fig. 2.

Referring now more particularly to the drawings, I show the cake turner as comprising a blade 10 secured to a stem or spindle 11 which is borne rotatably by the handle 12 within a bearing 13 provided therein. This bearing, which can be formed in a variety of ways, is preferably made directly in the handle and in substantially axial alinement therewith. To rotate the blade, suitable toothed gears such as a rack 14 and a segment or pinion 15 are provided which are operative directly by that hand of the operator which grasps the handle 12. More specifically, said pinion is secured to the spindle 11 in predetermined spaced relation to the free end 16 thereof so that by rotating the pinion, the spindle and consequently the blade is caused to rotate and the cake is turned. As an efficient and inexpensive mounting for the pinion, an extension or concentric flange 17 is provided thereon, while the spindle is provided with recesses or notches 18 into which portions 17ª of said flange are forced to form a strong and sure interlock between the pinion and the spindle. The rack or actuator 14 is positioned adjacent to the pinion to operate the same in a suitable manner. Preferably said actuator lies outwardly of the pinion for the sake of simplicity in construction as will be disclosed hereinafter, and at right angles to the plane of the pinion. When the spindle has been received in the bearing 13 to lie in normal position therein, the actuator and pinion will lie adjacent to the end of the handle. A suitable housing or ferrule 19 is provided having a hole 19ª to receive the spindle and co-operating with said end of the handle to retain said parts in operative position. More specifically, however, the handle is preferably provided with an enlarged bore 20 at its end to receive one or more of said parts, the pinion 15 being arranged to lie therein while the actuator is arranged to reciprocate therein as through the kerfs or slots 21. The ferrule 19 which is of cylindrical form is likewise provided with slots 22 at its sides for permitting the passage of said actuator therethrough so that it may be reciprocated to operate the pinion, said slots being for this purpose in registry with the slots 21 of the handle when the ferrule is secured in normal position to the handle. The slots 22 can be formed by making a cut in the side of the ferrule to the edge 19ᵇ thereof, removing a portion of the metal adjacent to said cut to form the openings 22, and then forcing the metal at the edge 19ᵇ back into normal position to form a uniform circular edge for the ferrule. The ferrule is secured to the handle in a suitable manner as by forming the prongs 23 at the edge thereof, and clinching the same into the handle.

The actuator, which comprises a rack, has a finger piece 25 at one end thereof and a stop 26 at another end, said finger piece being arranged to lie in upward position, its plane being approximately parallel in normal unoperated position to the plane of the blade. The stop 26 consists of a portion bent to lock with the portion of the ferrule adjacent to a slot 22. The actuator is preferably made of a single strip of metal as shown in Fig. 5 which is bent upon itself at 27 to have a portion 28 lying flat against the under surface of the finger piece, and bent again at a central point 29 at right angles to the finger piece to form the shank or rack portion.

To provide for a rapid and efficient reciprocation of the rack, a resilient member 30 is arranged to co-operate with the spindle to rotate the same in a direction opposite to that caused by the depression of the actuator. More specifically, when the operator desires to turn a cake which rests upon the blade, he will depress the actuator causing the pinion and in turn the blade to rotate to turn the cake. Upon release of the actuator, however, the resilient member 30 will operate automatically to rotate the spindle back again. The operation of the resilient member is as between the spindle 11 and a relatively fixed part such as the handle 12. Said member is located for this purpose adjacent to the end of the handle as within a bore 31 which is somewhat larger than the bore 13 which receives the spindle. The resilient member is a spring preferably of helical form and is mounted around said spindle as between the pinion 15 and the free end 16. Said spring has engaging means such as a hook 30ª at one end thereof which is received within a slot 21 of the handle and to retain that portion of the spring in fixed position relatively thereto. The opposite end of said spring is secured to the spindle as by raising a lip 32 thereon and clenching the same over the end of the spring as is shown in Fig. 6. It will now be seen that upon depressing the actuator as shown by the arrows *a* the spring tends to wind itself up as shown by the arrows *b*. Upon release of the actuator the spring unwinds, returning the blade to normal position.

For assembling the cake turner, it will be observed that the blade, the spindle, the pinion, and the ferrule form substantially a single unit. The spring 30 is slipped upon the spindle and then secured thereto, after which the free end of said spindle is inserted into the bearing in the handle, while the hook of the spring is received into the proper slot 21 of the handle. The spindle is then given a slight turn, placing the spring under tension and bringing the rack into position to be received within the slots 21. The ferrule is then secured in the proper manner to the handle, and the cake turner is ready for use.

I claim:

1. The herein described cake turner comprising, in combination, a blade, a stem to support the same, a handle to rotatably support said stem, and means co-operating with said stem to rotate the same, said means comprising an actuator formed of a single strip of material having a rack portion and a finger piece, the plane whereof is at an angle to said rack and is formed by making a double bend in said actuator, so as to bring the end of said rack in contiguity to said finger piece.

2. In a cake turner, the combination with a blade, a stem to support the same, and a handle to rotatably support said stem, of means operative by the hand of the operator for causing said stem to rotate, said means comprising a pinion mounted upon said stem and having a concentric flange, said stem having a notch formed in a side thereof, a portion of said flange being forced into said notch to form an interlock between said pinion and said stem.

3. In a cake turner, the combination with a blade, and a stem to support the same, of a handle to rotatably support said stem, means including a pinion, at an end of said handle for rotating said stem, and a ferrule at the end of said handle to house said means and receive a portion of said handle, said means comprising an actuator having a shank, said handle and said ferrule having registering slots to permit said actuator shank to move through the handle and the ferrule to engage said pinion and to rotate said stem.

In testimony whereof I affix my signature.

ANTHONY GIANNICO.